US007010708B2

(12) United States Patent
Ma

(10) Patent No.: US 7,010,708 B2
(45) Date of Patent: Mar. 7, 2006

(54) METHOD AND APPARATUS FOR ADAPTIVE CPU POWER MANAGEMENT

(75) Inventor: Kenneth Ma, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 531 days.

(21) Appl. No.: 10/146,554

(22) Filed: May 15, 2002

(65) Prior Publication Data

US 2003/0217296 A1 Nov. 20, 2003

(51) Int. Cl.
*G06F 1/32* (2006.01)

(52) U.S. Cl. ........................................ 713/322; 713/601

(58) Field of Classification Search ................ 713/300, 713/320, 322, 323, 324, 600, 601

See application file for complete search history.

(56) References Cited

U.S. PATENT DOCUMENTS 5,546,568 A * 8/1996 Bland et al. ................ 713/501
5,623,647 A * 4/1997 Maitra ........................ 713/501
5,719,800 A * 2/1998 Mittal et al. ................ 713/321
6,112,309 A * 8/2000 Inoue et al. ................ 713/501
6,823,516 B1 * 11/2004 Cooper ....................... 718/108
2001/0044909 A1 * 11/2001 Oh et al. .................... 713/600
2002/0194509 A1 * 12/2002 Plante et al. ................ 713/300

OTHER PUBLICATIONS

PCI Special Interest Group., *PCI Local Bus, Small PCI Specification, Version 1.5a, Final*, (Dec. 23, 1996).
Compaq Computer Corporation, Intel Corporation, Microsoft Corporation, Phoenix Technologies Ltd., Toshiba Corporation, *Advanced Configuration and Power Interface Specification, Revision 1.0b* (Feb. 2, 1999).

* cited by examiner

*Primary Examiner*—Dennis M. Butler
(74) *Attorney, Agent, or Firm*—McAndrews, Held & Malloy, Ltd.

(57) ABSTRACT

A method and apparatus are disclosed for performing adaptive run-time power management in a system employing a CPU and an operating system. A CPU cycle tracker (CCT) module monitors critical CPU signals and generates CPU performance data based on the critical CPU signals. An adaptive CPU throttler (THR) module uses the CPU performance data, along with a CPU percent idle value fed back from the operating system, to generate a CPU throttle control signal during predefined run-time segments of the CPU run time. The CPU throttle control signal links back to the CPU and adaptively adjusts CPU throttling and, therefore, power usage of the CPU during each of the run-time segments.

28 Claims, 5 Drawing Sheets

METHOD AND APPARATUS FOR ADAPTIVE CPU POWER MANAGEMENT

BACKGROUND OF THE INVENTION

Certain embodiments of the present invention provide an approach to perform adaptive run-time CPU power management in a system employing a central processing unit (CPU) and an operating system. In particular, certain embodiments provide for monitoring actual processes of the CPU from one time segment to another and adjusting the throttling of the CPU for the next time segment.

A CPU is the computing and control hardware element of a computer-based system. In a personal computer, for example, the CPU is usually an integrated part of a single, extremely powerful microprocessor. An operating system is the software responsible for allocating system resources including memory, processor time, disk space, and peripheral devices such as printers, modems, and monitors. All applications use the operating system to gain access to the resources needed. The operating system is the first program loaded into the computer as it boots up, and it remains in memory throughout the computing session.

Advanced CPUs are achieving higher performance as time goes on but, at the same time, are consuming more power and generating more heat making systems the use the CPUs more difficult to be implemented, especially in mobile form factors such as notebook computers, hand-held PDAs, or tablet PCs. Even for desktop PC implementation, the heat generated by the advanced CPUs mandates an active cooling mechanism, such as a fan sink, creating undesirable acoustic noise.

Previously, CPU power management has been implemented using an external power management controller (PMC) to monitor system activities at known legacy I/O or memory addresses to determine power management policy for an individual device. If all relevant system resources are powered down, then the PMC may then put the CPU into a lower power state.

For the Microsoft Windows® operating system environment, some software schemes use a so-called "CPU Cooler Program" to execute a halt instruction, or a "Ring 0 Program" to put the CPU into a lower power state when the operating system or applications are idle. The program takes advantage of the fact that the operating system will execute the "idle loop software module" when Windows® is not busy. The approach is only effective, however, if all tasks are idle and reported to Windows® as such.

More recently, Microsoft et al. published the ACPI (Advanced Configuration Power Interface) power management specification that is intended to provide a standardized, operating system-independent and platform-independent power management mechanism to enable the OSPM (operating system-directed power management) initiative. An ACPI-compatible operating system may balance CPU performance versus power consumption and thermal states by manipulating the processor performance controls.

OSPM is very effective for peripheral device power management, such as for UARTs or modems, since OSPM knows whether the port is opened or the modem is in use. However, OSPM is not effective with CPU power management since OSPM does not know nor can it predict the CPU workload. Therefore, OSPM is not able to set the CPU to the appropriate power state to execute user tasks without performance degradation while minimizing power consumption.

The ACPI specification defines a working state in which the processor executes instructions. Processor sleeping states, labeled C1 through C3, are also defined. In the sleeping states, the processor executes no instructions, thereby reducing power consumption and, possibly, operating temperatures.

Typically, the operating system puts the CPU into low power states (C1, C2, and C3) when the operating system is idle. In the low power states, the CPU does not run any instructions and wakes when an interrupt, such as the operating system scheduler's timer interrupt, occurs. Each processor sleeping state has a latency associated with entering and exiting that corresponds to the power savings. In general, the longer the entry/exit latency, the greater the power savings when in the state.

The C1 power state has the lowest latency. The hardware latency must be low enough such that the operating software does not consider the latency aspect of the state when deciding whether or not to use it. Aside from putting the processor in a non-executing power state, there are no other software-visible effects.

The C2 state offers improved power savings over the C1 state. The worst-case hardware latency is provided by way of the ACPI system firmware and the operating software may use the information to determine when the C1 state should be used instead of the C2 state. Aside from putting the processor in a non-executing power state, there are no other software-visible effects.

The C3 state offers improved power savings over the C1 and C2 states. The worst-case hardware latency is provided by way of the ACPI system firmware and the operating software may use the information to determine when the C2 state should be used instead of the C3 state. While in the C3 state, the processor's caches maintain state but ignore any snoops. The operating software is responsible for ensuring that the caches maintain coherency.

The operating system determines how much time is being spent in its idle loop by reading the ACPI Power Management Timer. The timer runs at a known, fixed frequency and allows the operating system to precisely determine idle time. The operating system will put the CPU into different quality low power states (that vary in power and latency) when it enters its idle loop, depending on the idle time estimate.

Whenever the operating system enters its idle loop and the processor is put in a low power state, an external event is typically relied upon to wake up the processor. The external event may be, for example, a keyboard stroke or a timer tick. Current operating systems use the timer tick to wake up the CPU regularly. When the CPU wakes up, it gets out of the idle loop and checks to see if there are any other task requests. If not, the CPU may enter its idle loop again and go to a low power state.

The operating system keeps track of the percentage of time that the CPU is idle and writes the idle percentage value to a register. For example, the CPU may have been idle for about 40% of a last predefined time period. Different operating systems use different windows of time to compute the idle percentage value. Older operating systems have longer idle loops. Newer operating systems have shorter idle loops in order to accommodate as many tasks as possible running simultaneously.

While in the working state (not sleeping), ACPI allows the performance of the processor to be altered through a defined "throttling" process and through transitions into multiple performance states.

Other CPU power management schemes are also known which use statistical methods to monitor CPU host interface (sometimes known as Front-Side Bus) activities to determine average CPU percent utilization and set the CPU throttling accordingly. However, advanced CPUs incorporate large caches which hide greater than 90% of the CPU activities within the CPU core. Therefore, the FSB percent utilization has little correlation to the actual core CPU percent utilization. As a result, prior implementations cannot correctly predict CPUs with super-pipelined architectures and integrated caches.

Cache is a section of very fast memory (often static RAM) reserved for the temporary storage of the data or instructions likely to be needed next by the processor.

Further limitations and disadvantages of conventional and traditional approaches will become apparent to one of skill in the art, through comparison of such systems with embodiments of the present invention as set forth in the remainder of the present application with reference to the drawings.

These and other advantages, aspects and novel features of the present invention, as well as details of an illustrated embodiment thereof, will be more fully understood from the following description and drawings.

BRIEF SUMMARY OF THE INVENTION

An embodiment of the present invention provides for adaptively adjusting the throttling of a CPU, in a computer-based system employing a CPU and an operating system, to provide CPU power management. The throttling is performed in real time on a time segment by time segment basis and uses the CPU percent idle value generated by the operating system and fed back from the CPU to help determine the level of throttling for the next time segment.

A method of the present invention provides for generating a set of boot-time profiles during a CPU boot time such that the boot-time profiles correspond to CPU performance of known code segments run during the boot time. Run-time parameter blocks are then generated during CPU run time where the run-time parameter blocks store key processing performance parameters corresponding to predefined runtime segments of the CPU run time. During the CPU run time, the CPU is monitored for a CPU percent idle value and a corresponding time stamp. A CPU throttle control signal is generated for the next run-time segment in response to at least the set of boot-time profiles, a sliding window of the run-time parameter blocks, and a last monitored CPU percent idle value and time stamp. The CPU throttle control signal adjusts CPU throttling and, therefore, power consumption of the CPU during each of the run-time segments.

Apparatus of the present invention provides a CPU cycle tracker (CCT) module to monitor critical CPU signals and to generate CPU performance data in response to the critical CPU signals. An adaptive CPU throttler module is responsive to the CPU performance data, along with a CPU percent idle value fed back from the operating system, to generate a CPU throttle control signal during predefined run-time segments of the CPU run time. The CPU throttle control signal links back to the CPU and adaptively adjusts CPU throttling and, therefore, power consumption of the CPU during each of the run-time segments.

Certain embodiments of the present invention afford an approach to perform adaptive run-time CPU power management in a system employing a CPU and an operating system by monitoring the actual core processes of the CPU from one time segment to another.

DETAILED DESCRIPTION OF THE INVENTION

Figure 1:
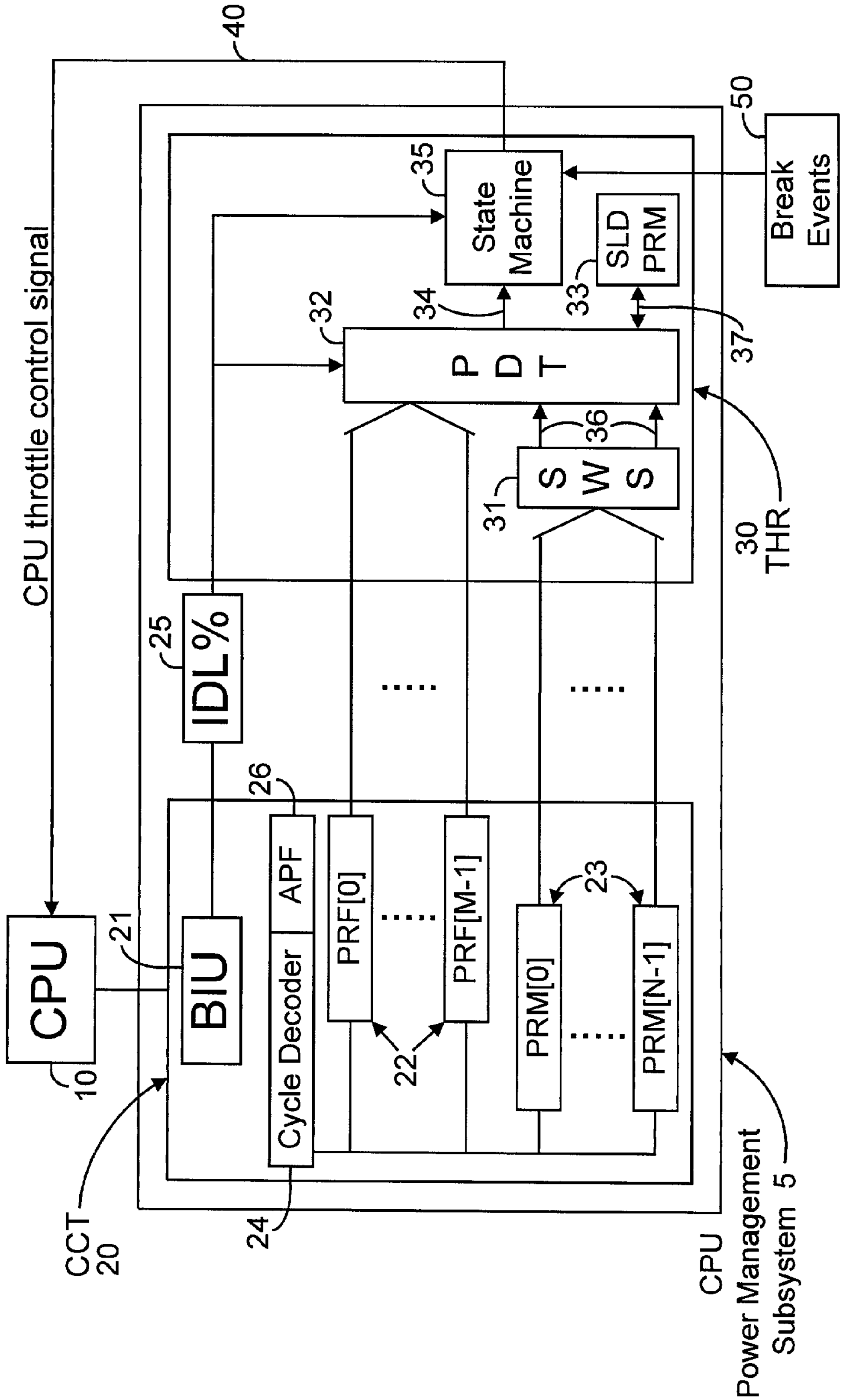
FIG. 1 is a schematic block diagram of an apparatus for achieving adaptive CPU power management in accordance with an embodiment of the present invention.

FIG. 1 is a schematic block diagram of a CPU power management subsystem 5 interfacing to a CPU 10 in accordance with an embodiment of the present invention. CPU power management subsystem 5 includes a CPU cycle tracker (CCT) module 20 and an adaptive CPU throttler (THR) module 30.

The CCT module includes a bus interface unit (BIU) module 21, a cycle decoder module 24, and an auto-profiler (APF) module 26. THR module 30 includes a sliding window selector (SWS) module 31, a predictor (PDT) module 32, a sliding window parameter (SLD PRM) module 33, and a state machine module 35.

Figure 2:
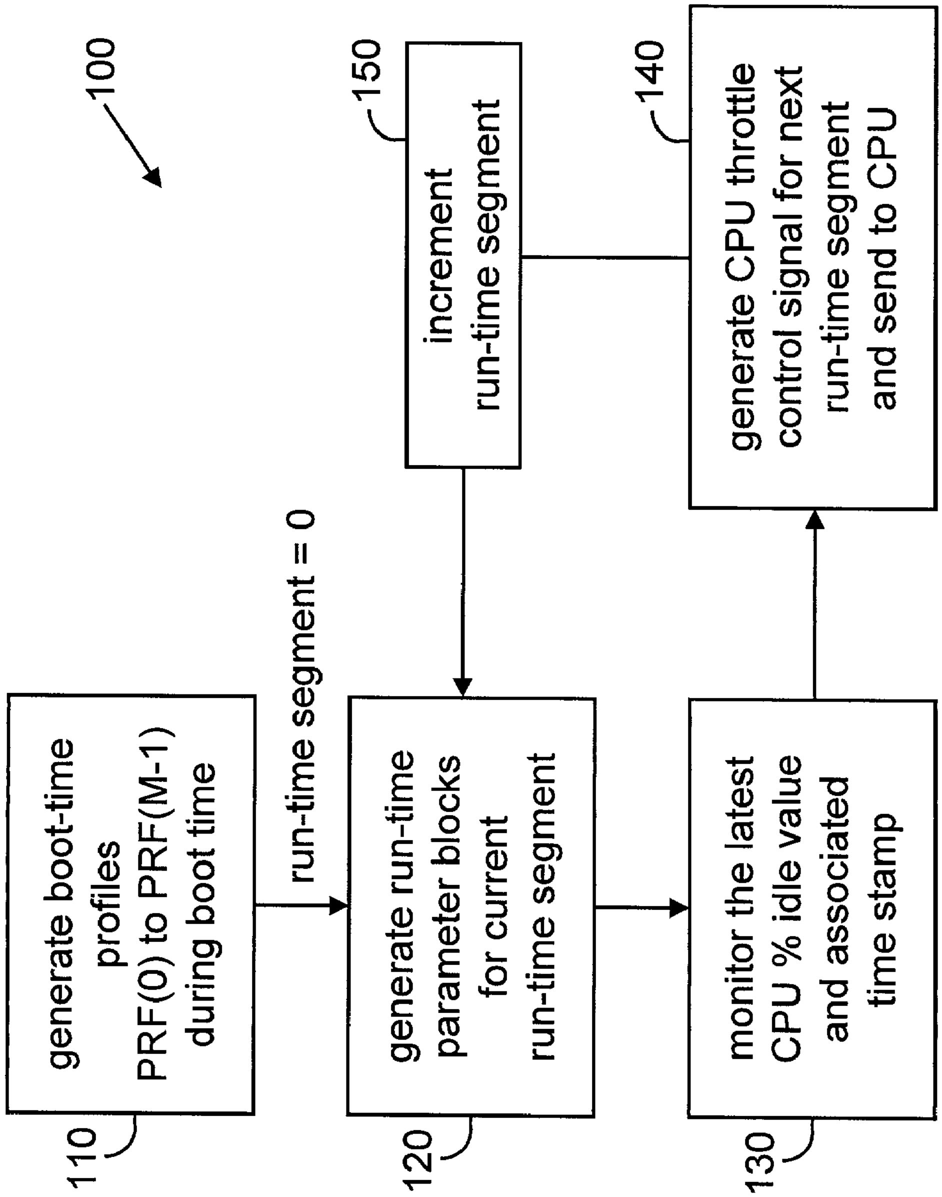
FIG. 2 is a flowchart of a method for achieving adaptive CPU power management using the apparatus in FIG. 1 in accordance with an embodiment of the present invention.

FIG. 2 is a flowchart of a method 100 for achieving adaptive CPU power management using the CPU power management subsystem 5 of FIG. 1, for example, in accordance with an embodiment of the present invention.

Critical CPU signals are monitored by BIU module 21 during both CPU boot time and CPU run time. In step 110, during CPU boot-time, the CCT module 20 generates a set of boot-time profiles 22 (PRF(0) to PRF(M-1)) in response to the critical CPU signals. The boot-time profiles 22 correspond to the CPU performance of known code segments that are run during boot time. In an embodiment of the present invention, the APF module 26 within the CCT module 20 is run at CPU boot time to specifically generate the boot-time profiles 22.

The resultant boot-time profiles 22 include CPU performance data generated by running various CPU, memory, and I/O intensive code segments and by correlating bus cycle behavior to CPU percent load using the cycle decoder module 24 and the APF module 26. The cycle decoder module 24 tracks and counts cycle types and addresses and correlates addresses between non-consecutive cycles as part of generating the CPU performance data.

Some of the known code segments may include 3D graphics, scientific computations, CAD functions, video decoding, and file copying. There are M boot-time profiles that are generated where M is an integer number. Each boot-time profile PRF(m) corresponds to some application or function. For example, PRF(0) may correspond to a code trace of Microsoft Word, PRF(1) may correspond to a code trace of a computer game, etc.

The boot-time profiles are updated every time the CPU is re-booted. As a result, for example, if the user runs a system at 1 GHz today, the boot-time profiles will be generated based on 1 GHz. If tomorrow the user upgrades his system with a 2 GHz CPU, the boot-time profiles will be update accordingly upon boot up.

In step 120, the CCT module 20 generates run-time parameter blocks 23 (PRM(0) to PRM(N−1)) during run time of the CPU. Each run-time parameter block PRM(n) corresponds to a particular run-time segment n. The CPU run time is broken up into N consecutive run-time segments. Each run-time segment may be, for example, a ten microsecond window. In an embodiment of the present invention, the run-time segments are programmable based on the particular CPU and operating system, making the CPU power management subsystem 5 relatively independent of the CPU and operating system.

As time progresses while the CPU is running (during run time, not boot time), the CCT module 20 is monitoring the critical CPU signals and generates a run-time parameter block PRM(n) for the current run-time segment n. Each run-time parameter block that is generated comprises an integer number W of key processing performance parameters. The key processing performance parameters may include, for example, one or more of: a total number of CPU accesses per unit time, a total number of memory data read/write accesses per unit time, a peak/average read cycle density, a peak/average write cycle density, a read-to-write ratio, a percent of consecutive read accesses, a percent of consecutive write accesses, and a number of spikes in cycle density that pass peak density on an accumulated average basis. Again, one run-time parameter block is generated for each run-time segment n.

In step 130, the CCT module 20 also monitors a CPU percent idle value and associated time stamp of when the CPU percent idle value was last computed by the operating system. Typically, the operating system employs an idle loop software module to generate the CPU percent idle value and time stamp. The CPU percent idle value serves as a feedback signal from the operating system to the CPU power management subsystem 5.

The CPU percent idle value is stored in a register and is read by BIU module 21 and passed to THR module 30. The fixed boot-time profiles 22 are also passed to THR module 30. The run-time parameter blocks 23 are passed to the SWS module 31 of THR module 30. The SWS module 31 selects a sliding window subset of the run-time parameter blocks 23 for subsequent processing. For example, for run-time segment n+1 (next run-time segment), the SWS module may select PRM(n−9) through PRM(n), the last ten run-time segments.

In step 140, the PDT module 32 collapses the sliding window subset of run-time parameter blocks into a single accumulated average run-time parameter block 37 and stores the accumulated average run time parameter block 37 in SLD PRM module 33. In an embodiment of the present invention, PDT module 32 comprises a statistical predictive algorithm that compares the PRF profiles and the PRM parameter blocks and employs the CPU percent idle value and sliding window subset to generate a CPU throttling percentage value 34 for the next run-time segment n+1.

In other words, PDT module 32 predicts a CPU throttling percentage value 34 for the next run-time segment n+1 based on the fixed boot-time profiles 22, the sliding window subset of run-time parameter blocks 23, the last generated CPU percent idle value and time stamp 25, and the accumulated average run-time parameter block 37.

Also in step 140, the predicted CPU throttling percentage value 34 and the CPU percent idle value 25 are passed to state machine 35. State machine 35 generates a CPU throttle control signal 40 based on the CPU throttling percentage value 34 and the CPU percent idle value 25. The CPU throttle control signal 40 is linked back to the CPU 10 to adjust the throttling of the CPU 10 for the next run-time segment n+1, thus completing the feedback loop between the CPU 10 and the CPU power management subsystem 5. The time stamp of the CPU percent idle value determines how much to factor the CPU percent idle value into the prediction.

In an embodiment of the present invention, the CPU throttle control signal comprises a CPU stop clock signal that is fed back to a STPCLK# signal input of the CPU. The CPU stop clock signal may be a digital logic high during a portion of the run-time segment and a digital logic low during another portion of the run-time segment. When the CPU stop clock signal is a logic high, the CPU begins processing and when the CPU stop clock signal is a logic low, the CPU stops processing.

As a result, the duty cycle of the CPU stop clock signal controls the throttling of the CPU 10 on a time segment by time segment basis. The duty cycle of the CPU stop clock signal is adjusted for each run-time segment based on the most recently computed CPU throttle percentage value 34 and CPU percent idle value 25 for the last run-time segment.

Figure 3:
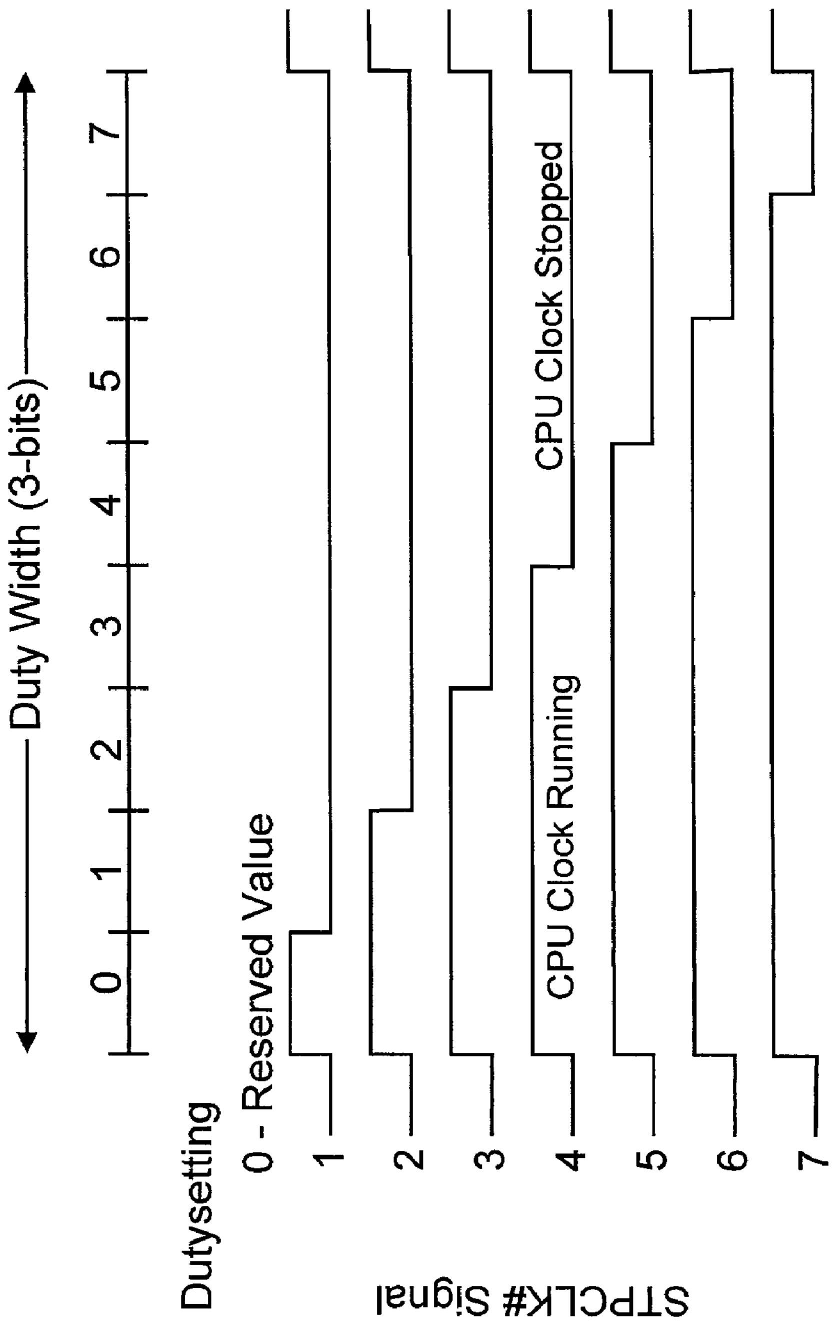
FIG. 3 is an exemplary illustration of various possible duty cycle configurations of a CPU throttle control signal generated by the apparatus of FIG. 1 and method of FIG. 2 in accordance with an embodiment of the present invention.

FIG. 3 illustrates the outputs of an 8-state (3-bit) state machine 35 in accordance with an embodiment of the present invention. As may be seen in FIG. 3, the resultant stop clock signal may take on any of eight possible duty cycle states. Other state machine implementations may be used as well such as, for example, a 32-state (5-bit) state machine.

As may be seen in step 150, the run-time parameter blocks are updated as the system increments through each run-time segment and the predictive process starts over again to generate a new CPU throttle control signal for the next upcoming run-time segment. In accordance with an embodiment of the present invention, once the maximum number, N, of run-time parameter blocks is reached, the oldest parameter block PRM(0) is replaced with PRM(N−1) and the process continues to create the successive parameter blocks as the run-time segment is incremented.

The CPU core is controlled internally to be active or not active on a time segment by time segment basis according to the CPU throttle control signal. The CPU power management subsystem 5 dynamically knows whether the CPU is in action or not and how much power the CPU actually needs to process current tasks. The CPU power management subsystem 5 effectively provides just enough power to the CPU to process current tasks. The subsystem effectively constitutes a "power-on-demand" mechanization. Certain embodiments of the present invention are transparent to other power management protocols and are compatible with ACPI.

Figure 4:
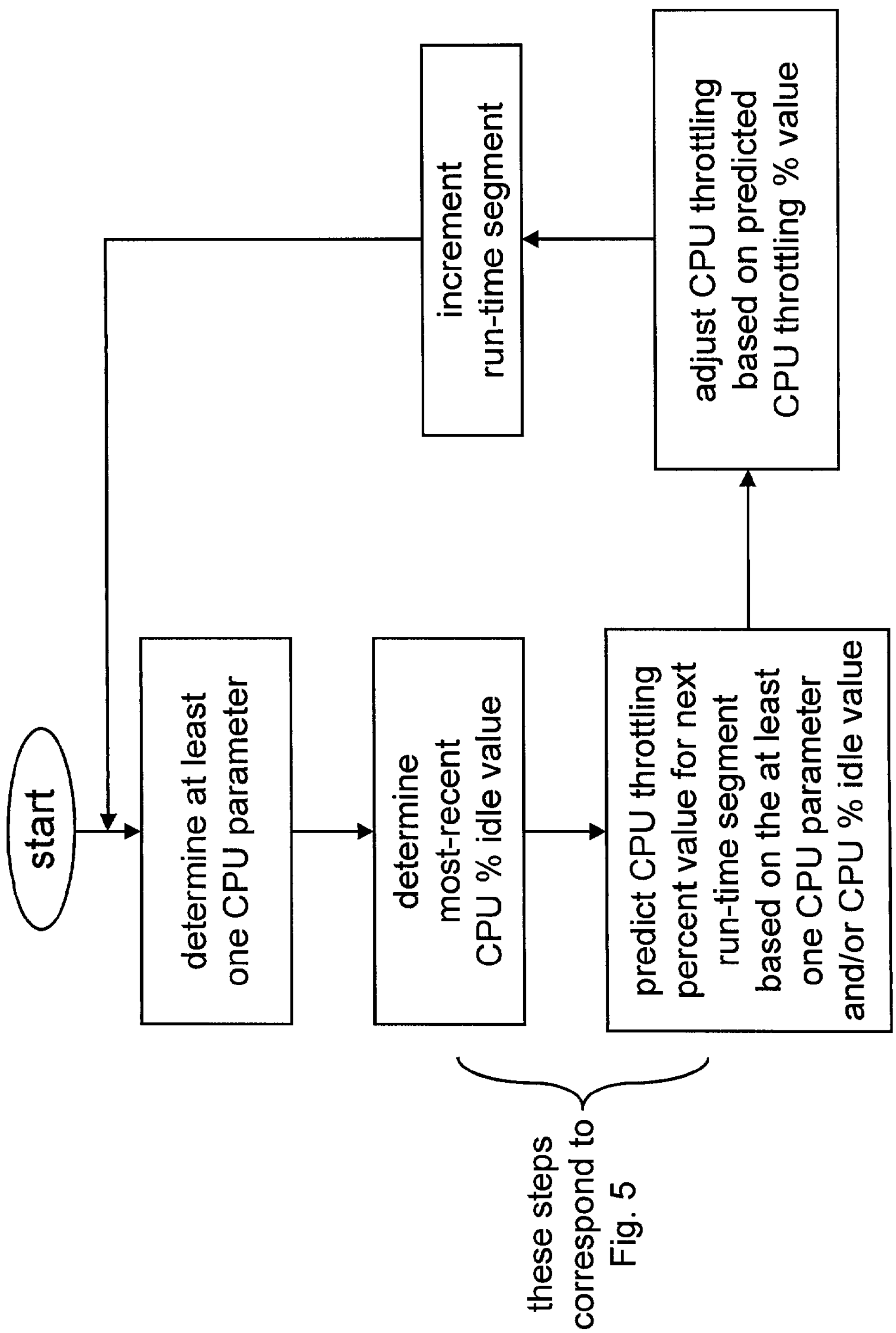
FIG. 4 is a flow chart illustrating a method for achieving adaptive CPU power management where at least one CPU parameter is used in determining how to adjust the CPU throttling in accordance with an embodiment of the present invention.

FIG. 4 illustrates a particular embodiment of the present invention where at least one CPU parameter is used in determining how to adjust the CPU throttling (a potentially simplified embodiment). The at least one CPU parameter may be a boot-time parameter or a run-time parameter.

Figure 5:
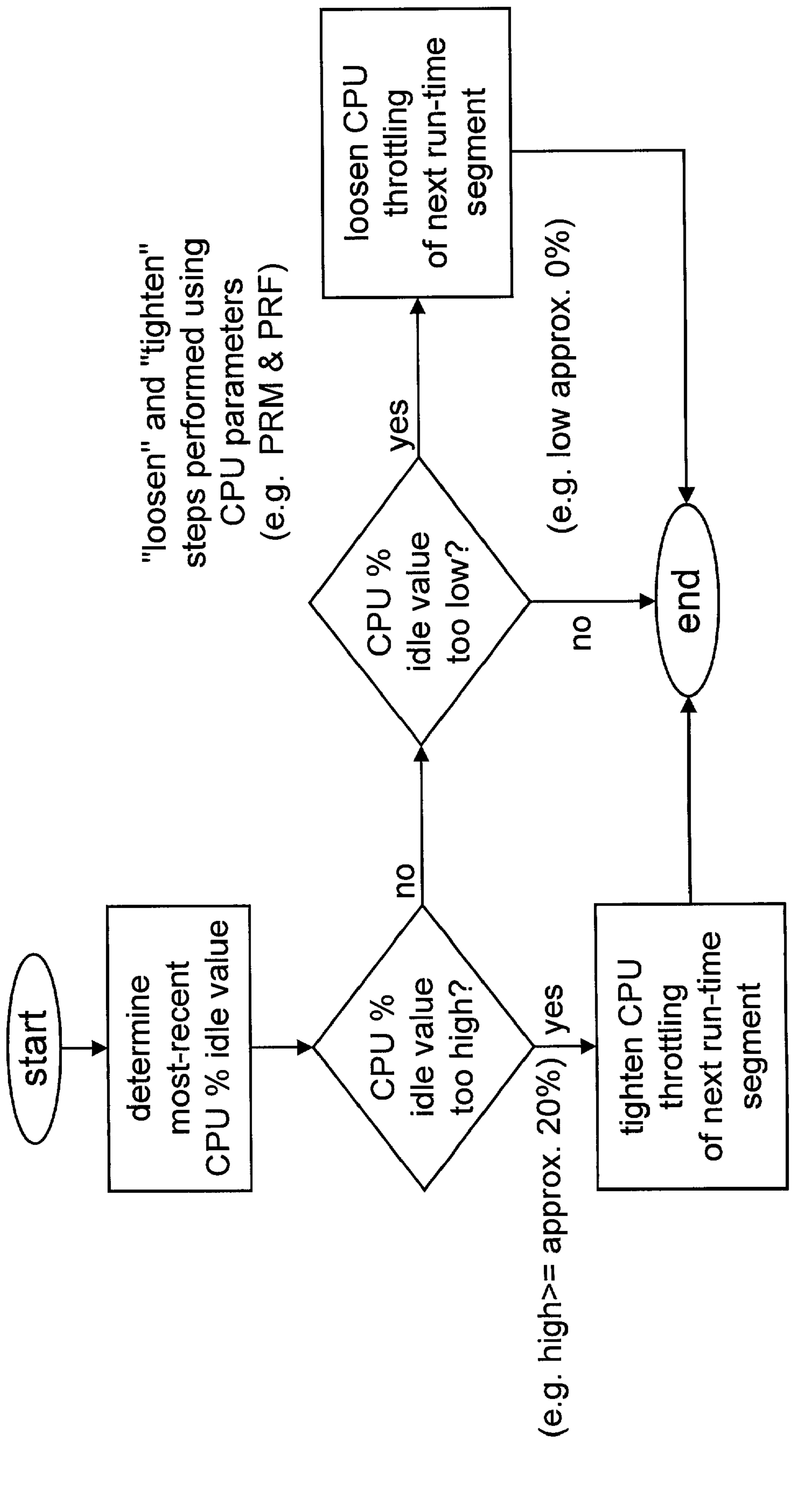
FIG. 5 is a more detailed flow chart of a portion of the method of FIG. 4 and illustrates how a CPU percent idle value may be used to decide whether to tighten or loosen the CPU throttling in accordance with an embodiment of the present invention.

FIG. 5 illustrates more specifically how the fed back CPU percent idle value may be used to decide whether to tighten or loosen the CPU throttling in accordance with an embodiment of the present invention.

The various elements of CPU power management subsystem 5 may be combined or separated according to various embodiments of the present invention. For example, the BIU module 21 and cycle decoder module 24 may be combined to form a single module. Also, the SWS module 31 and SLD PRM module 33 may be combined into a single module.

Also, the various modules may be implemented as various combinations of software and/or hardware modules. For example, the PDT module 32 may be a software module running on the THR module 30 which may be a hardware module.

In summary, certain embodiments of the present invention afford an approach to perform adaptive run-time CPU power management for a system employing a CPU and an operating system by monitoring the actual processes of the CPU from one time segment to another and by creating a feedback loop between the CPU and a CPU power management subsystem.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. In a system employing a CPU and an operating system, a method for performing adaptive run-time power management of said CPU, said method comprising:

- generating a set of boot-time profiles during a CPU boot time, said boot-time profiles corresponding to CPU performance of known code segments run during said boot time;
- generating run-time parameter blocks during CPU run time, said run-time parameter blocks storing key processing performance parameters corresponding to predefined run-time segments of said CPU run time;
- monitoring said CPU during said CPU run time for a CPU percent idle value and a corresponding time stamp; and
- generating a CPU throttle control signal for a next run-time segment based on at least one of said set of boot-time profiles, a sliding window of said run-time parameter blocks, and a last monitored CPU percent idle value and time stamp, such that said CPU throttle control signal adjusts CPU throttling and, therefore, power consumption of said CPU during each of said run-time segments.

2. The method of claim 1 wherein generating said set of boot-time profiles comprises running an auto-profiler (APF) software module at said CPU boot time.

3. The method of claim 1 wherein said set of boot-time profiles comprises CPU performance data generated by running various CPU, memory, and I/O intensive code segments and correlating bus cycle behavior to CPU percent load.

4. The method of claim 1 wherein said known code segments correspond to at least one of 3D graphics, scientific computations, CAD functions, video decoding, and file copying.

5. The method of claim 1 wherein said key processing performance parameters comprise at least one of:

- a total number of CPU accesses per unit time;
- a total number of memory data read/write accesses per unit time;
- a peak/average read cycle density;
- a peak/average write cycle density;
- a read-to-write ratio;
- a percent of consecutive read accesses;
- a percent of consecutive write accesses; and
- a number of spikes in cycle density that pass peak density on an accumulated average basis.

6. The method of claim 1 wherein said CPU percent idle value and said time stamp are generated by an idle loop software module of said operating system.

7. The method of claim 1 wherein said CPU throttle control signal is generated, at least in part, by a predictive algorithm.

8. The method of claim 1 wherein said CPU throttle control signal comprises a CPU stop clock signal that is a digital logic high during at least a portion of each of said run-time segments.

9. The method of claim 1 wherein said CPU throttle control signal comprises a CPU stop clock signal that is a digital logic low during at least a portion of each of said run-time segments.

10. The method of claim 1 wherein a level of said CPU throttling for a particular run-time segment is defined by a duty cycle of said CPU throttle control signal for said particular run-time segment.

11. The method of claim 1 wherein said CPU stops processing when said CPU throttle control signal is in a first logic state and said CPU begins processing when said CPU throttle control signal is in a second logic state.

12. The method of claim 1 wherein said predefined run-time segments are programmable.

13. In a system employing a CPU and an operating system, apparatus for performing adaptive run-time power management of said CPU, said apparatus comprising:

- a CPU cycle tracker (CCT) module that monitors critical CPU signals and generates CPU performance data based on said critical CPU signals wherein said CCT module comprises a CPU bus interface unit (BIU) module to enable monitoring of said critical CPU signals by said CCT module; and
- an adaptive CPU throttler (THR) module that generates a CPU throttle control signal based on said CPU performance data during predefined run-time segments of a CPU run time such that said CPU throttle control signal adjusts CPU throttling and, therefore, power consumption of said CPU during each of said run-time segments.

14. In a system employing a CPU and an operating system, apparatus for performing adaptive run-time power management of said CPU, said apparatus comprising:

- a CPU cycle tracker (CCT) module that monitors critical CPU signals and generates CPU performance data based on said critical CPU signals wherein said CCT module comprises a cycle decoder module to track and count cycle types and addresses and correlate addresses between non-consecutive cycles as part of generating said CPU performance data; and
- an adaptive CPU throttler (THR) module that generates a CPU throttle control signal based on said CPU performance data during predefined run-time segments of a CPU run time such that said CPU throttle control signal adjusts CPU throttling and, therefore, power consumption of said CPU during each of said run-time segments.

15. In a system employing a CPU and an operating system, apparatus for performing adaptive run-time power management of said CPU, said apparatus comprising:

a CPU cycle tracker (CCT) module that monitors critical CPU signals and generates CPU performance data based on said critical CPU signals, wherein said CPU performance data comprises: a set of boot-time profiles generated by said CCT module during a CPU boot time, said boot-time profiles corresponding to CPU performance of known code segments run during said boot time; run-time parameter blocks generated by said CCT module during said CPU run time, said run-time parameter blocks storing key processing performance parameters corresponding to said predefined run-time segments of said CPU run time; and a CPU percent idle value and a corresponding time stamp; and an adaptive CPU throttler (THR) module that generates a CPU throttle control signal based on said CPU performance data during predefined run-time segments of a CPU run time such that said CPU throttle control signal adjusts CPU throttling and, therefore, power consumption of said CPU during each of said run-time segments.

16. The apparatus of claim 15 wherein said adaptive CPU throttler (THR) module comprises a sliding window selector (SWS) module to select a sliding window subset of said run-time parameter blocks generated by said CCT module wherein said sliding window subset covers an integer number of said predefined run-time segments of said CPU run time.

17. The apparatus of claim 16 wherein said adaptive CPU throttler (THR) module further comprises a predictor (PDT) module to adaptively generate a CPU throttling percentage value for a next run time segment based on at least one of said set of boot time profiles, said sliding window subset of said run-time parameter blocks, accumulated average parameter data, and a last generated CPU percent idle value and time stamp.

18. The apparatus of claim 17 wherein said adaptive CPU throttler (THR) module further comprises a sliding window parameter (SLD PRM) module wherein said accumulated average parameter data is generated by said PDT module in response to said sliding window subset of said run-time parameter blocks and is stored in said SLD PRM module.

19. The apparatus of claim 17 wherein said adaptive CPU throttler (THR) module further comprises a state machine generating said CPU throttle control signal based on using said CPU percent idle value and said CPU throttling percentage value such that said CPU throttle control signal is compliant with CPU protocol and timing requirements.

20. The apparatus of claim 15 wherein said CCT module employs an auto-profiler (APF) software module to generate said set of boot-time profiles.

21. The apparatus of claim 15 wherein said operating system and CPU employ an idle loop software module to generate said CPU percent idle value and said time stamp.

22. The apparatus of claim 17 wherein said PDT module employs a predictive algorithm to adaptively generate said CPU throttling percentage value.

23. The apparatus of claim 15 wherein said set of boot-time profiles comprises CPU performance data generated by running various CPU, memory, and I/O intensive code segments and by correlating bus cycle behavior to CPU percent load.

24. The apparatus of claim 15 wherein said known code segments correspond to at least one of 3D graphics, scientific computations, CAD functions, video decoding, and file copying.

25. The apparatus of claim 15 wherein said key processing performance parameters comprise at least one of:

a total number of CPU accesses per unit time;

a total number of memory data read/write accesses per unit time;

a peak/average read cycle density;

a peak/average write cycle density;

a read-to-write ratio;

a percent of consecutive read accesses;

a percent of consecutive write accesses; and a number of spikes in cycle density that pass peak density on an accumulated average basis.

26. In a system employing a CPU and an operating system, a method for performing adaptive run-time power management of said CPU, said method comprising:

generating a set of boot-time profiles during a CPU boot time, said boot-time profiles corresponding to CPU performance of code segments during said boot time;

generating run-time parameter blocks during CPU run rime, said run-time parameter blocks storing processing performance parameters corresponding to predefined run-time segments of said CPU run time;

monitoring said CPU during said CPU run time for a CPU percent idle value and a corresponding time stamp; and generating a CPU throttle control signal for a next run-time segment based on at least one of said set of boot-time profiles, a sliding window of said run-time parameter blocks, and a last monitored CPU percent idle value and time stamp.

27. The method of claim 26 wherein generating said set of boot-time profiles comprises running an auto-profiler (APF) software module at said CPU boot time.

28. The method of claim 26 wherein said CPU percent idle value and said time stamp are generated by an idle loop software module.

* * * * *